US010234173B2

(12) United States Patent
Nordin et al.

(10) Patent No.: US 10,234,173 B2
(45) Date of Patent: *Mar. 19, 2019

(54) METHOD FOR CONVEYING CONCENTRATED SOLAR POWER

(71) Applicant: RODLUVAN INC., Southern Pines, NC (US)

(72) Inventors: Kenneth Nordin, Bratislava (SK); Mats Olof Erik Mattsson, Oviken (SE)

(73) Assignee: Rodluvan Inc., Raleigh, NC (US)

( * ) Notice: Subject to any disclaimer, the term of this patent is extended or adjusted under 35 U.S.C. 154(b) by 258 days.

This patent is subject to a terminal disclaimer.

(21) Appl. No.: 15/349,774

(22) Filed: Nov. 11, 2016

(65) Prior Publication Data

US 2018/0073771 A1    Mar. 15, 2018

Related U.S. Application Data

(60) Provisional application No. 62/394,880, filed on Sep. 15, 2016.

(51) Int. Cl.

| F24S 20/61 | (2018.01) |
|---|---|
| F24S 80/20 | (2018.01) |
| F24S 20/20 | (2018.01) |
| F24S 23/00 | (2018.01) |
| F24S 30/45 | (2018.01) |
| F24S 60/00 | (2018.01) |
| F24S 23/30 | (2018.01) |

(52) U.S. Cl.
CPC .............. *F24S 20/61* (2018.05); *F24S 20/20* (2018.05); *F24S 23/12* (2018.05); *F24S 23/30* (2018.05); *F24S 30/45* (2018.05); *F24S 60/00* (2018.05); *F24S 80/20* (2018.05); *Y02E 10/41* (2013.01); *Y02E 10/46* (2013.01); *Y02E 10/47* (2013.01); *Y02E 10/52* (2013.01)

(58) Field of Classification Search
CPC . F26A 20/61; F24S 20/20; F24S 23/12; F24S 30/45; F23S 23/30
USPC ................. 126/600–608, 656–657, 698–699
See application file for complete search history.

(56) References Cited

U.S. PATENT DOCUMENTS

| 4,267,824 | A | * | 5/1981 | O'Halloran | ............. | F24S 23/00 |
| | | | | | | 126/601 |
| 4,447,718 | A | * | 5/1984 | Mori | ..................... | G01S 3/7861 |
| | | | | | | 250/203.1 |
| 4,483,311 | A | * | 11/1984 | Whitaker | ................ | F24S 23/31 |
| | | | | | | 126/602 |
| 2018/0073776 | A1 | * | 3/2018 | Nordin | ................... | F22B 1/006 |

* cited by examiner

*Primary Examiner* — Vivek K Shirsat
(74) *Attorney, Agent, or Firm* — Rolf Fasth; Fasth Law Offices

(57) ABSTRACT

The method is for conveying solar power from a sun. A solar concentrator conveys and concentrates solar power as rays into a cable. The solar concentrator has a tapering device disposed at a bottom thereof. The cable has a first curved glass loop section, a second curved glass loop section and a curved section. The curved glass section is connected to a storage unit wherein the light is converted into heat. The first loop section is rotated relative to the second loop section at a first gap and the second section is rotated relative to the curved section at a second gap so that the concentrator can follow the path of the sun during the day.

4 Claims, 7 Drawing Sheets

FIG. 6

METHOD FOR CONVEYING CONCENTRATED SOLAR POWER

PRIOR APPLICATION

This U.S. patent application claims priority from US Provisional Patent Application No. 62/394,880 filed 15 Sep. 2016.

TECHNICAL FIELD

The invention relates to a method for conveying concentrated solar power.

BACKGROUND AND SUMMARY OF THE INVENTION

Solar power or solar energy has been used for many decades for heating dwellings and water and for generating electricity. Because solar power is a renewable energy source much effort has been made to develop systems to use such energy. The costs have been high and the storage of energy has not been very effective. A significant problem is the need for effectively positioning solar concentrators relative to the sun as the sun moves during the day. The best thick plastic fibers available in the market have been studied but none of these provided the required level of optical transmission in the near-infrared (NIR) and a large fraction of the incident energy is lost in the waveguides after only a few meters propagation. The efficiencies of conventional systems have been low and there is a need for a more efficient and cost effective system.

The method of the present invention provides a solution to the above-outlined problems. More particularly, the solar power system is for conveying solar power from a sun. A solar concentrator is provided that is in operative engagement with a cable. The solar concentrator has a length (l) that is longer than its width (w) at the upper surface of the solar concentrator. A cone-shaped tapering device is disposed at a bottom of the solar concentrator that is connected to a cable. The cable has a first curved glass loop section, a second curved glass loop section and a curved section. The curved glass section is in operative engagement with, for example, a storage unit. The first curved loop section and the second curved glass loop section have a first gap defined therebetween. The second curved glass loop section and the curved glass section have a second gap defined therebetween. The solar concentrator receives solar power as rays and via a lens conveys and concentrates the rays as light to the tapering device that further focuses the light. The tapering device is in communication with an upper end of the first curved glass loop section. The first curved glass loop section conveys the light to the second curved glass loop section via and across the first gap. The second curved glass loop section conveys the light to the curved glass section via and across the second gap. The curved glass section conveys and emits the light into an inside of the storage unit wherein the light converts into heat upon impact with the storage unit to heat the storage unit. While transmitting light, the first curved glass loop section is rotated relative to the second curved glass loop section at the first gap. The second curved glass loop section is rotated relative to the curved glass section at the second gap so that the solar concentrator follows a path of a sun.

In another embodiment, the second cone-shape is substantially congruent with the first cone-shape.

In yet another embodiment, rays are conveyed and reflected inside the tapering device.

In another embodiment, the curved glass section conveys and emits the light into an inside of the storage unit wherein the light converts into heat upon impact with the storage unit to heat the storage unit.

BRIEF DESCRIPTION OF DRAWINGS

FIG. 1Bb is a schematic side view of the solar power system shown in FIG. 1 along line A;

DETAILED DESCRIPTION

Figure 1A:
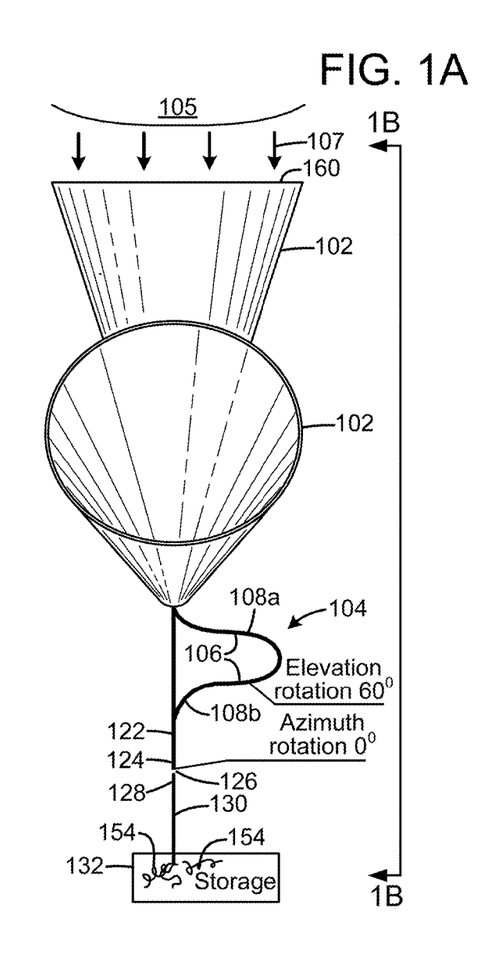
FIG. 1A is a schematic front view of a solar power system of the present invention.
Figure 1B:
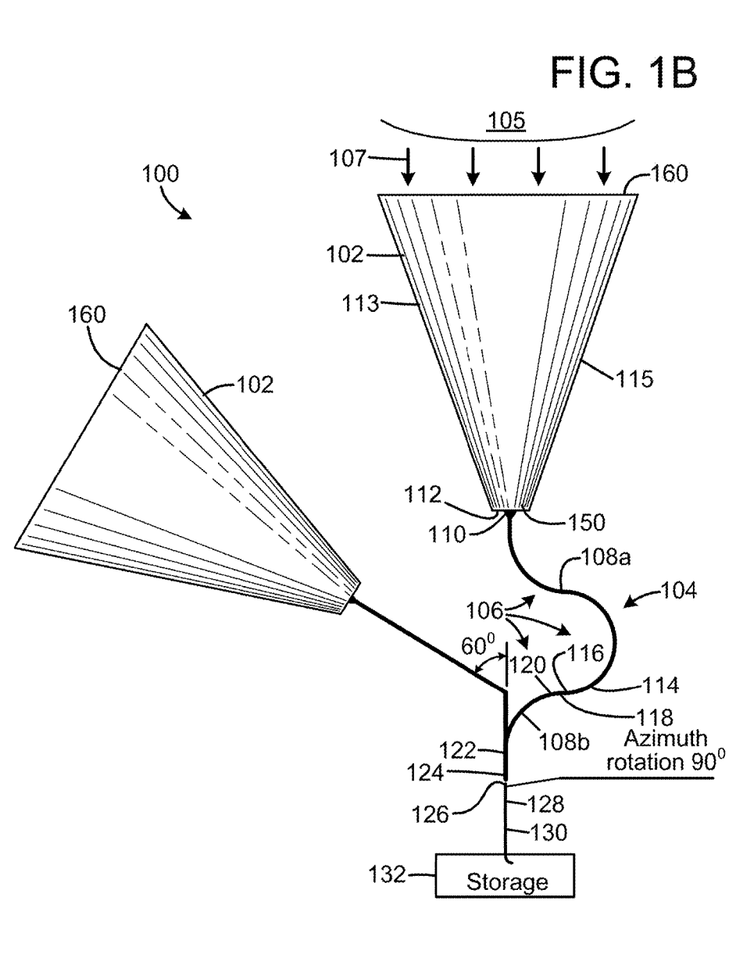

FIGS. 1a-1b are schematic overviews of the solar power system 100 of the present invention. As described in detail below, one important feature of the present invention is that the solar concentrator 102 is rotatable in two directions so that it is not necessary to use light transmitting cables that are bendable as the panel 111 moves with the path of the sun 105. The system 100 has conical-shaped or tapered solar concentrators 102 that concentrate beams or rays 107 received from the sun 105 and convey the light beams 107 to a tapering device 200 that is in communication with and connected to a fiber-optic cable 104 (best seen in FIG. 4). The cable 104 may be made of a suitable silica or doped glass material. The cable 104 could be flexible but with the current technology, it is only possible to make flexible cables that are 1.5 mm or smaller and when the cable is bent too much the light cannot propagate in the cable without losses. The cable 104 should preferably be greater than 1.5 mm and more preferably about 6 mm in diameter and the cable 104 can be stiff, as explained in detail below, due to a periscope mechanism that enables cable section to be moved relative to one another. One function of the solar concentrator 102 is to concentrate the rays 107' to a focus segment 150. The tapering device 200 then further concentrates the rays 107" further to the diameter of the cable 104 so that less glass or silica can be used in cable 104. When the concentrator 102 and tapering device 200 are correctly dimensioned, the amount of glass/silica used in the cable 104 can be reduced with up to 90%. The upper surface 204 of the tapering device 200 could be positioned at the focus segment 150 but in the preferred embodiment the upper surface 204 is placed above the focus segment 150 and made wider than the length (K) of the focus segment to accommodate for inaccuracies in the construction of the solar concentrator 102 and its lens 160. The conical shape of the tapering device 200 is unique to accomplish a total internal reflection of the light inside the tapering device 200 and so that the light can propagate inside the tapering device 200 without substantial loss of light through the side walls 218, 220 of the tapering device 200. Preferably, the upper surface 204 of the tapering device 200 is treated with an anti-reflective substance to minimize losses of light.

Figure 2A:
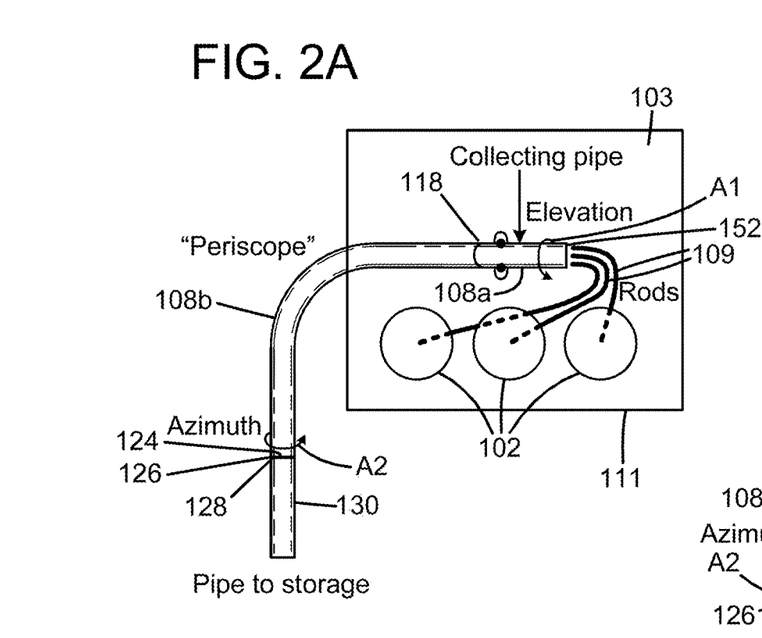
FIG. 2A is a perspective view of a portion of the solar power system of the present invention.

It is to be understood that many solar concentrators 102 may be used in a panel 111, as shown in FIG. 2a. The solar concentrator 102 has a suitable lens 160, such as Fresnel lenses or a solar guiding system, to concentrate the sunrays 107 to the focal line or focal segment 150. The focal segment 150 may be treated as a mirror image of the width of the sun 105 as seen at the focal segment 150. There is an error of about 0.5° at the outer edges of the focal segment 150. In one preferred embodiment, when the lens 160 of concentrator 102 is about one square meter at the upper end thereof then the focal segment 150, after the concentration of the sun rays by the lens, has a diameter of about 20 millimeters. It should be noted that when the width and the length of the solar concentrator 102 are the same, the focal segment 150 is shortest i.e. about 18 mm when the width and length of the solar concentrator 102 are about 1 meter. However, as explained below, although it is desirable to make the focal segment 150 as short as possible to minimize the amount of glass needed in the cable 104, it has surprisingly been realized that the focal segment should be larger than the minimum 18 mm. This is accomplished by designing the solar concentrator 102 with a length (l) that is longer than its width (w) at the upper end of the solar concentrator 102 wherein the lens 160 is located.

It is possible to use many fibers in each cable so that a plurality of lenses in the solar concentrator may be used also to increase the amount of energy conveyed by the cable 104. For example, if the total area of all the lenses is about 25 square meters in the solar concentrator then about 25 fibers may be included in the cable 104.

Figure 2B:
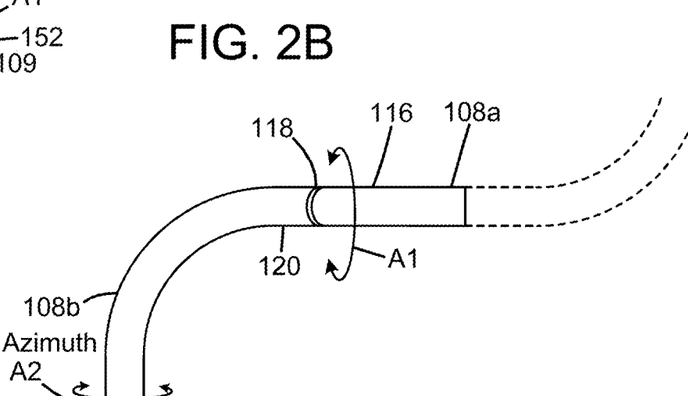
FIG. 2B is a detailed perspective view of the gaps formed between the loop sections of the present invention.
Figure 2C:
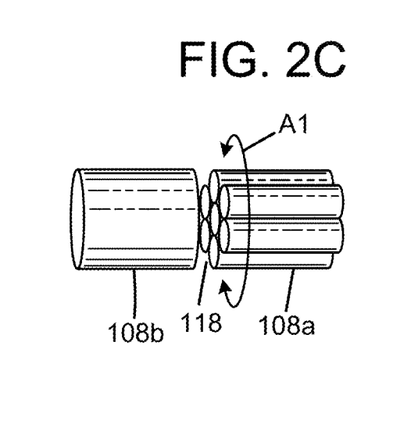
FIG. 2C is a detailed perspective view of one of the gaps of the present invention.

The cable 104 may be made of doped glass or another suitable fiber optic material that includes a carbon pattern that can handle all the visible wave-lengths of the sun light or sun rays received by the concentrator 102. In general, the visible wave-lengths have the most energy and are the most desirable to convey. The carbon pattern may have hollow rods of different sizes around a central opening of each fiber that extend along the fiber that act as reflection surfaces and guide the sun rays or light towards the central opening of each fiber in the cable 104. For example, each fiber may contain seven hollow rods and each rod is about 1.7 micrometers. Other dimensions may also be used. In this way, it is possible to effectively transport the sun rays or light of different wave-lengths via the cable 104. The cable 104 may be non-bendable and carries the light at a range of visible (and non-visible) wave-lengths. Instead of using the cable 104, it is also possible to use solid glass in the fibers although the energy losses are greater, the range of wave-lengths that can be carried is more limited and it may be necessary to use relatively thick glass rods which are difficult or impossible to bend without breaking the rods. Preferably, high purity silica should be used in the cable 104. However, as indicated above, large diameter silica is not flexible. It was discovered that a two-axis rotation of the solar concentrator 102 makes it possible to track the azimuth and elevation of the sun 105 in the sky to optimize the energy captured by the solar concentrators 102. The cable 104 may include a plurality of glass rods connected to solar concentrators 102 that are tightly packet such as up to 36 glass rods that are placed in a framework 103 of a panel 111. The coupling of light from up to 36 rods into a glass periscope is accomplished by leading each rod into a hub 152 (best seen in FIG. 2a). The bundling of the plurality of rods 109 is best shown in FIGS. 2a-2c. The rods could be attached to the panel with Fresnel lenses and because of the elevation of the sun, the entire panel with the rods should be able to face the horizon at sunrise and sunset and zenith for low latitudes.

By using a solar concentrator 102 in combination with the tapering device 200, the number of glass rods included in cable 104 could be reduced to one or a few rods. The lens 160 of the solar concentrator 102 enables the rays 107 to be concentrated to the focal segment 150.

An important feature of the present invention is that the cable 104 has a periscope section that includes a curved loop segment 106 that is divided into a first curved glass loop section 108a and a second curved glass loop section 108b. The first loop section 108a has an upper end 110 in operative engagement with or connected to a tapering device 200 disposed in the concentrator 102 at a bottom 112 thereof. The section 108a has a lower end 114 terminates at an end surface 116. The end surface 116 is aligned with but separated by a first gap 118 from an upper end surface 120 of the second loop section 108b. The end surfaces 116 and 120 are preferably treated with an anti-reflective substance to minimize losses of light. The loop section 108b has a lower end 122 that terminates at an end surface 124. The loop sections 108a and 108b together form a somewhat U-shaped loop segment 106. The end surface 124 is aligned with but separated by a second gap 126 from an upper end surface 128 of a straight cable section 130 that is directly or indirectly connected to a high-temperature storage system or unit 132 and preferably extends into an inside of the storage unit 132. It is of course possible not to use a storage unit 132 and to lead the light into another substance such as water. The end surfaces 116, 120; and 124, 128 are preferably treated with anti-reflective layers to minimize losses of light. Preferably, the end surfaces 116, 120; and 124, 128 should be so close to one another, such as less than 1 mm, that even sunbeams that have been reflected by the end surfaces can be transmitted or propagated across the gap from one section to another section. It is preferable that the end surfaces of each loop section remain parallel as the concentrator 102 is moved i.e. the gaps 118 and 126 should not change in shape as the concentrator 102 is moved.

The storage unit 132 may have a sapphire window 133, that lets the light carried in the cable 130 through, where the cable section 130 enters the storage unit 132 to reduce heat losses so that the cable section 130 terminates just above the sapphire glass 133 that could handle temperatures in the range of 1800° C. The storage unit 132 may also include a rotatable lock that can be rotated to follow the sun during the day. The storage system may include a suitable high temperature resistant material such as MgO that can handle 1000° C. while maintaining mechanical integrity. The cable section 130 may be helically shaped or have any other form inside the storage unit 132.

The rotation at the second gap 126 enables the concentrator 102 to accompany the sun's azimuth during the day i.e. to follow the sun 105 as the sun moves during the day. The rotation at the first gap 118 enables the concentrator to accompany elevational changes of the sun 105 during the day.

In this way, the cable 104 and cable section 130 carry the conveyed light energy collected in the concentrator 102 to the inside of the storage unit 132. The concentrator 102 can, in this way, be directed towards the sun and follow the path of the sun without using bendable cables. This in turn means larger diameter cables that are not bendable may be used. In the storage unit 132, the light is converted to heat upon impact with the material inside the storage unit 132. The storage unit 132 may be made of any suitable material such as concrete, sand or any other material that is suitable for storing heat in a range of 300-1000° C. Preferably, the temperatures are higher than 300° C. in order to make electricity.

Because there is the first gap 118 between the first loop section 108a and the second loop section 108b, the first loop section 108a is rotatable relative to the second loop section 108b. In this way, the concentrator 102 may be moved from an upright position to a sloping position (pointing towards the viewer), as shown in FIG. 1a. Similarly, because there is a second gap 126 between the second loop section 108b and cable section 130, the second loop section 108b is rotatable relative to cable section 130 so that the concentrator 102 may, for example, be turned sideways, as best shown in FIG. 1b. This enables the movement of the concentrator 102 without bending any of the loop sections of cable 104. In this way, the concentrator 102 can be moved and adjusted to the location of the sun relative to the earth. It is to be understood that the concentrator 102 is also supported by a frame to prevent it from falling to the ground. FIGS. 2a and 2b show detailed views of the loop sections 108a and 108b and the gaps 118, 126 defined therebetween. The ability to rotate section 108a relative to section 108b is illustrated by the round arrow A1 in FIG. 2b and FIG. 2c. The ability to rotate section 108b relative to section 130 is illustrated by round arrow A2 in FIG. 2b.

Figures 3, 3A, 3B, 3C:
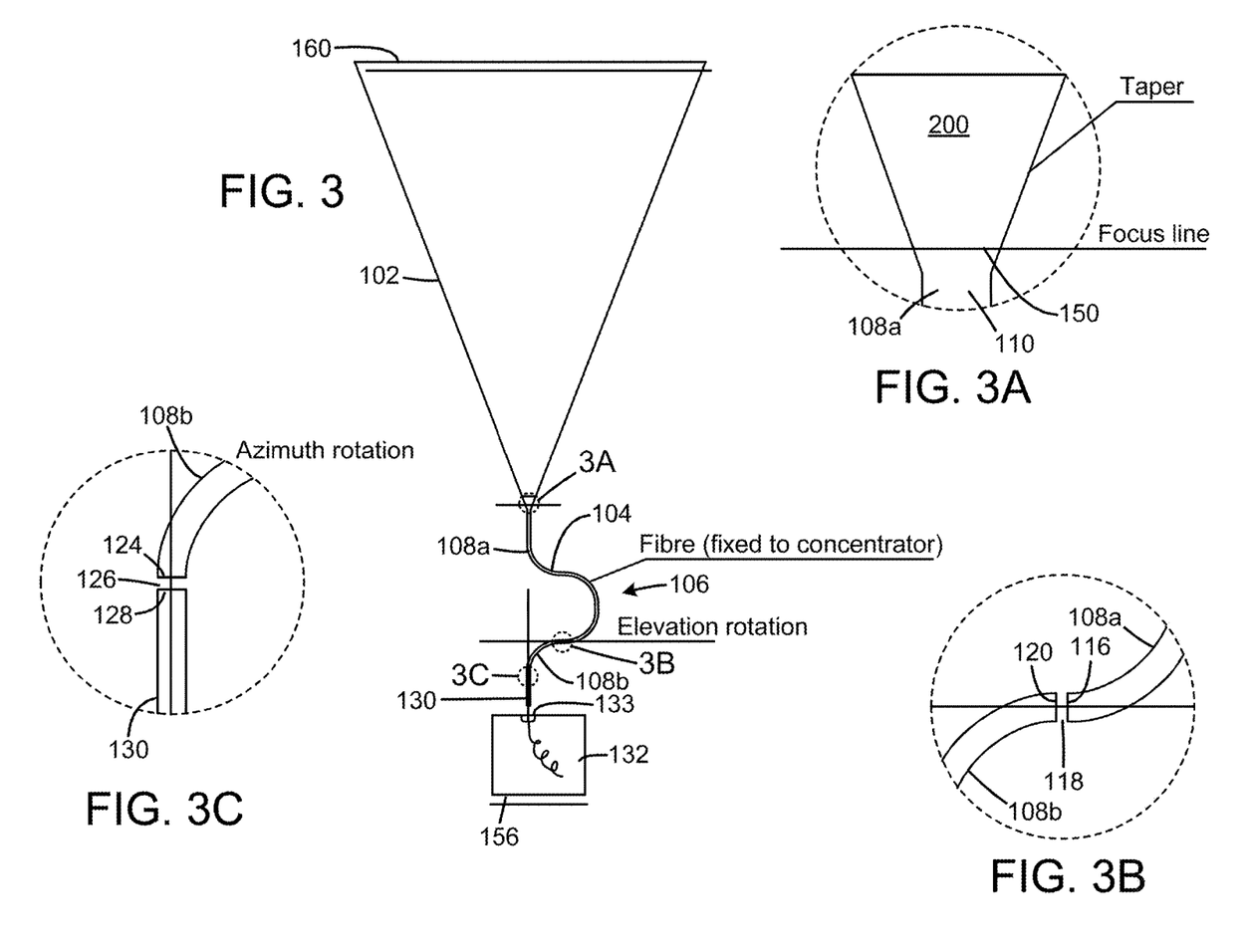
FIG. 3 is a front elevational view of the solar power system of the present invention.
FIG. 3A is a front elevational view of the taper device.
FIG. 3B is a detailed view of the loop sections and the gap therebetween.
FIG. 3C is a detailed view of vertical loop sections and the gap therebetween.

FIG. 3 is a forward elevational view of the system 100 wherein section 108a is attached to bottom 112 that is located below focal segment or focus line 150. FIG. 3A is a front elevational view of the taper device 200. FIG. 3B is a detailed view of the loop sections 108a, 108b and the gap 118 therebetween. FIG. 3C is a detailed view of loop sections 108b and 130 and the gap 126 therebetween.

FIGS. 1a-1b show cross-sectional side views of the storage unit 132. The fiber section 130 is connected to relatively long spiral-formed glass-rods 154 disposed inside the storage unit 132. It is also possible to direct the light directly from the solar concentrator 102 via the air to the ends of the glass-rods that extend out of the storage unit 132. One drawback of the latter design is that the solar concentrator 102 should be relatively close to the storage unit and that the storage unit 132 must be unobstructed and visible from the solar concentrator. Another option is to use the solar power to heat gas that, in turn, is circulated into the storage unit 132 to heat the glass rods disposed in the unit.

The hot glass-rods convert the light energy, carried in the fiber cable 104 and section 130, to heat the storage unit 132. More particularly, as the rods 154 emit light inside the storage unit 132 the light energy is converted into heat. When the rods are substantially straight the light is reflected on the inside walls of the fiber cable and no or very little light is emitted. However, when the fiber cable is sufficiently bent or curved then light escapes from the fiber. In other words, the light energy is mostly emitted where the rods are bent and this light energy is converted into heat inside the storage unit 132. The spiral shape of the rods 154 increases the contact surface area against the storage unit 132 to improve the transfer of heat from the glass-rods 154 to the storage unit 132. At the end of the rods 154 very little light energy remains so the end does not create much heat. As mentioned above, it is also possible to transfer the light energy from the solar concentrator 102 directly to the storage 132 by directly directing or reflecting the light energy to the glass-rods 154 that are sticking out of the storage unit 132. In this way, the glass rods 154 are heated. A straight rod, shaped like a cone, also works but makes it more difficult to accomplish an even energy distribution in the storage unit. It is important to realize that, in the present invention, the light is not converted to heat until it impacts the storage unit which means the fiber optic cable is not heated by the solar energy. The conversion to heat does not occur until the light impacts the material inside storage unit 132. Also, it is important to realize that, in the present invention, the solar energy is not used to directly heat a flow of a medium such as gas. Instead, the light is, preferably, first converted to heat inside the storage unit to heat the storage unit (i.e. not a gas flow) that, in turn, may be used to heat gas 156 or any other medium that flows outside the storage unit 132.

Figure 4:
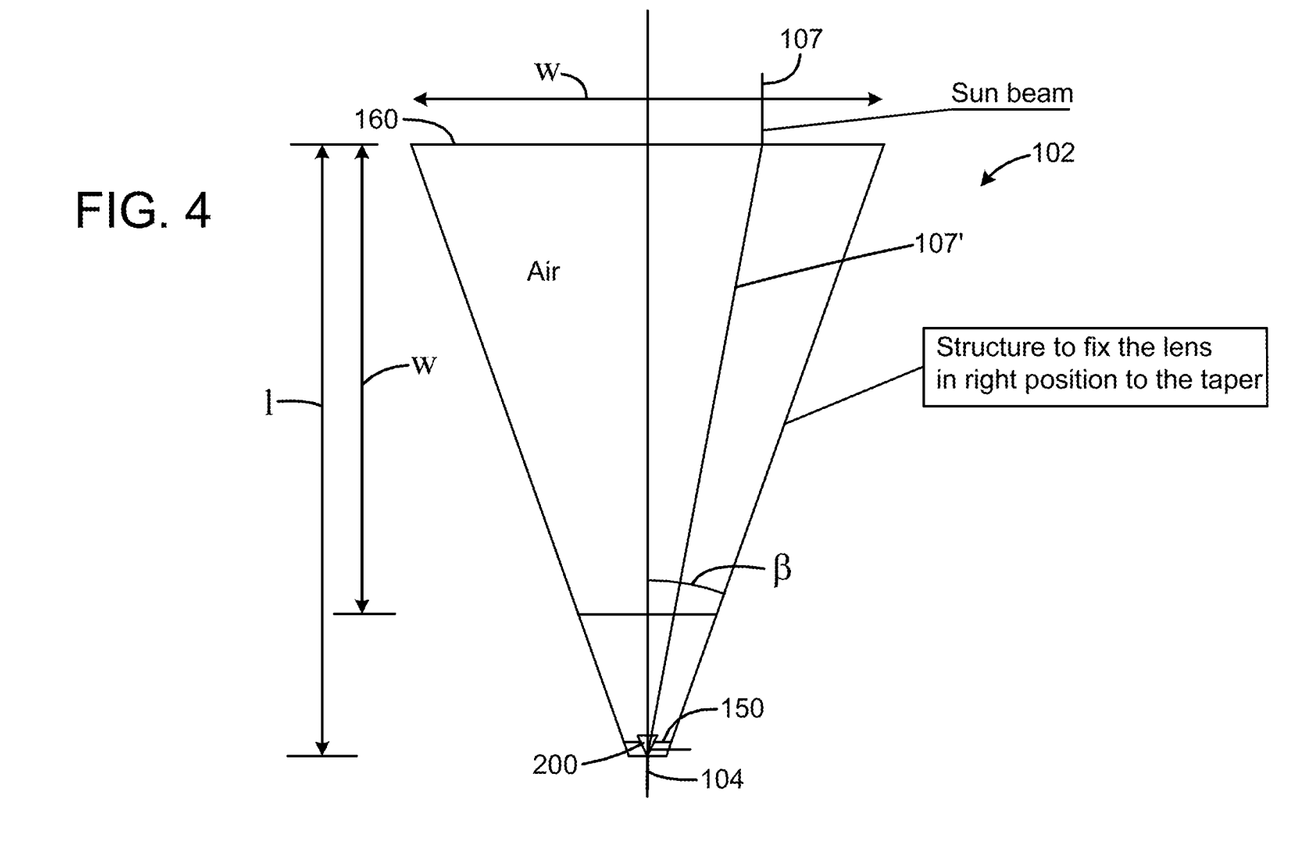
FIG. 4 is a front elevational view of the passage of the solar rays through the solar concentrator.

FIG. 4 is an elevational view of the solar concentrator 102 connected to the cable 104 and shows how the solar beams 107 pass through the lens 160 disposed at the top of the solar concentrator 102 and into a tapering unit 200 disposed at the bottom of the solar concentrator 102. The concentrator 102 has a width (w) and a length (l). In general, it has been believed that the length (l) should be as short as possible relative to the width (w) to shorten the length of the focus line or segment 150 and to minimize the size of the concentrator 102. However, it was surprisingly discovered that the length (l) of the concentrator 102 should be greater than the width (w) although the length (K) of the focus segment 150 becomes longer and the size of the concentrator increases and it makes it more difficult to hold the concentrator 102 in place in a frame. The modification of using a length that is longer than the width thus makes the focus segment longer. For example, the width may be about 1 meter and the length about 1.3 meters. As seen in FIG. 4, the lens 160 changes the direction of the sun beam 107 as it passes through the lens 160 and is directed towards tapering unit 200 disposed at the bottom of the solar concentrator 102. Preferably, the angle (β) should be less than 30° or more preferably about 20-22° by increasing the length (l) of the solar concentrator 102 from length (w) to length (l), as shown in FIG. 4. The tapering unit 200 is then disposed at the bottom of concentrator 102 to further concentrate the sunbeams 107', as explained in detail below. After the sunbeams 107 have passed lens 160 they are marked as 107' in the figures. Surprisingly, the length of the focus line 150 only increased from about 18 mm to about 20 mm when the length (l) was made 30% longer relative to the width (w). The tapering unit 200 then reduces the focus line from 20 mm to about 6 mm at the bottom surface 206. Although it would be enough to use tapering unit 200 with a width of 20 mm, it is preferable to use a tapering unit 200 that has a width of about 40 mm at the top surface 204 to accommodate for any misalignment of the top surface 204 and the lens 160. One preferred feature is that the tapering unit 200 is congruent with the downwardly directed and truncated triangular or conical shape of the solar concentrator 102 so that the sides 218, 220 of the tapering device 200 are parallel with the sidewalls 113, 115 of the solar concentrator 102. The use of the lens 160 in combination with the tapering device 200 reduces the amount glass needed in the cable 104 with about 90%. One drawback of the lengthened solar concentrator 102 is that the reflection angles inside the cable 104 increase.

Figure 5:
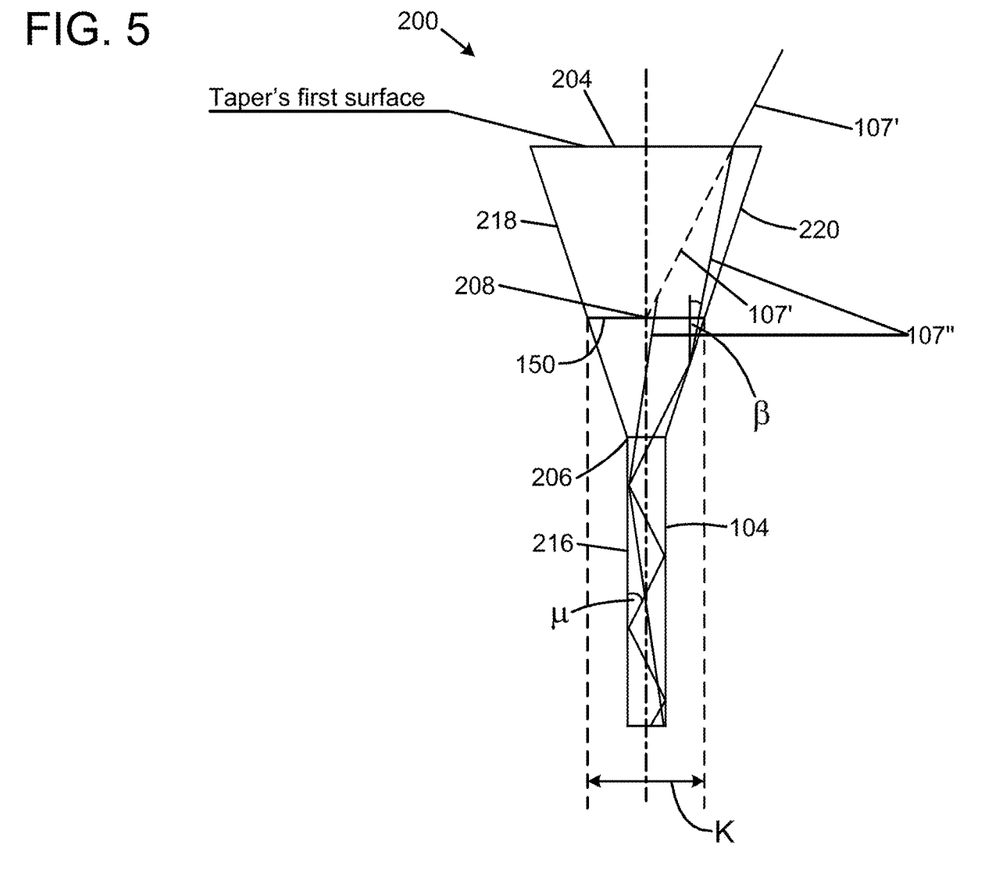
FIG. 5 is a front elevational view of the tapering unit connected to the fiber optic cable.

FIG. 5 is an elevational view of the tapering unit 200 (disposed inside solar concentrator 102) connected to cable 104. As mentioned above, unit 200 has, preferably, the same shape as concentrator 102 i.e. the length is longer than the width and has a conical or triangular shape with a truncated bottom surface that is connected to the cable 104. The unit 200 is preferably solid and made of silica or doped glass. The tapering unit 200 has the top surface 204 and the bottom surface 206. Preferably, the top surface 204 is treated with a suitable anti-reflection substance to reduce undesirable reflections of the sunbeams. The length of the top surface 204 is designed to be a bit longer than what is theoretically necessary in case the lens 160 and the tapering device 200 are not perfectly aligned. When perfectly aligned, the top surface 204 would only have to have a width that corresponds to the width of the focal segment 150 that in turn is dependent upon the lens 160 and the shape of the solar concentrator 102. The unit 200 has a theoretical focal position 208 on focal segment 150 had the sun beam 107' continued to travel in the air inside solar concentrator 102 (as indicated by the dashed line 107') without passing into the unit 200. The top surface 204 of the unit 200 causes the sun beam 107' to change the direction as shown by sunbeam 107" similar to when light passes through a lens. The beam 107" inside unit 200 bounces or is reflected off side walls 218, 220 of unit 200.

An important feature is that the reflection angle beta ($\beta$) must be 30° or less otherwise the beam 107" cannot properly enter cable 104 without bouncing back and forth at the inlet without going into cable 104. The cable 104 is currently 6 mm in diameter and if angle $\beta$ is 30° or slightly greater then cable 104 must be 10 mm or greater to prevent loss of the beam inside the cable 104. This is disadvantageous because it means more glass must be used in cable 104 which makes it more expensive and extremely difficult to bend. Another important advantage of using an angle $\beta$ that is less than 30°, more preferably about 22°, is that then the angle $\mu$ is not greater than about 40-41° because the angle $\mu$ must be less than the total internal reflection angle of the material of cable 104 i.e. so that the light can propagate in the fibers of the cable without loss. This is important because when angle $\mu$ is greater than total internal reflection angle i.e. about 40-41°, the sun beam 107" passes through the outer wall 216 of cable 104. By making the focal segment 150 longer than necessary, the reflection angles $\beta$ inside the tapering device 200 are reduced that in turn reduces the reflection angles $\mu$ inside the cable 104. It is also important that the reflection angles inside the tapering device 200 are less than the total internal reflection angle (usually about 40-41°) to prevent the sun beam 107' from escaping through the sidewalls 218, 220 of the tapering device 200.

The surprising and unexpected effect of increasing the focus line or area 150 from 18 mm to 20 mm (by making the concentrator 102 elongate i.e. to have a length that is longer than its width) was thus that it was then possible to reduce the diameter of the cable 104 while maintaining the reflection angle to be less than the total internal reflection angle. Any angle greater than the total reflection angle means that light no longer can propagate within the tapering device 200 and cable 104 without escaping through the walls of the tapering device 200 and/or the cable 104.

Figure 6:
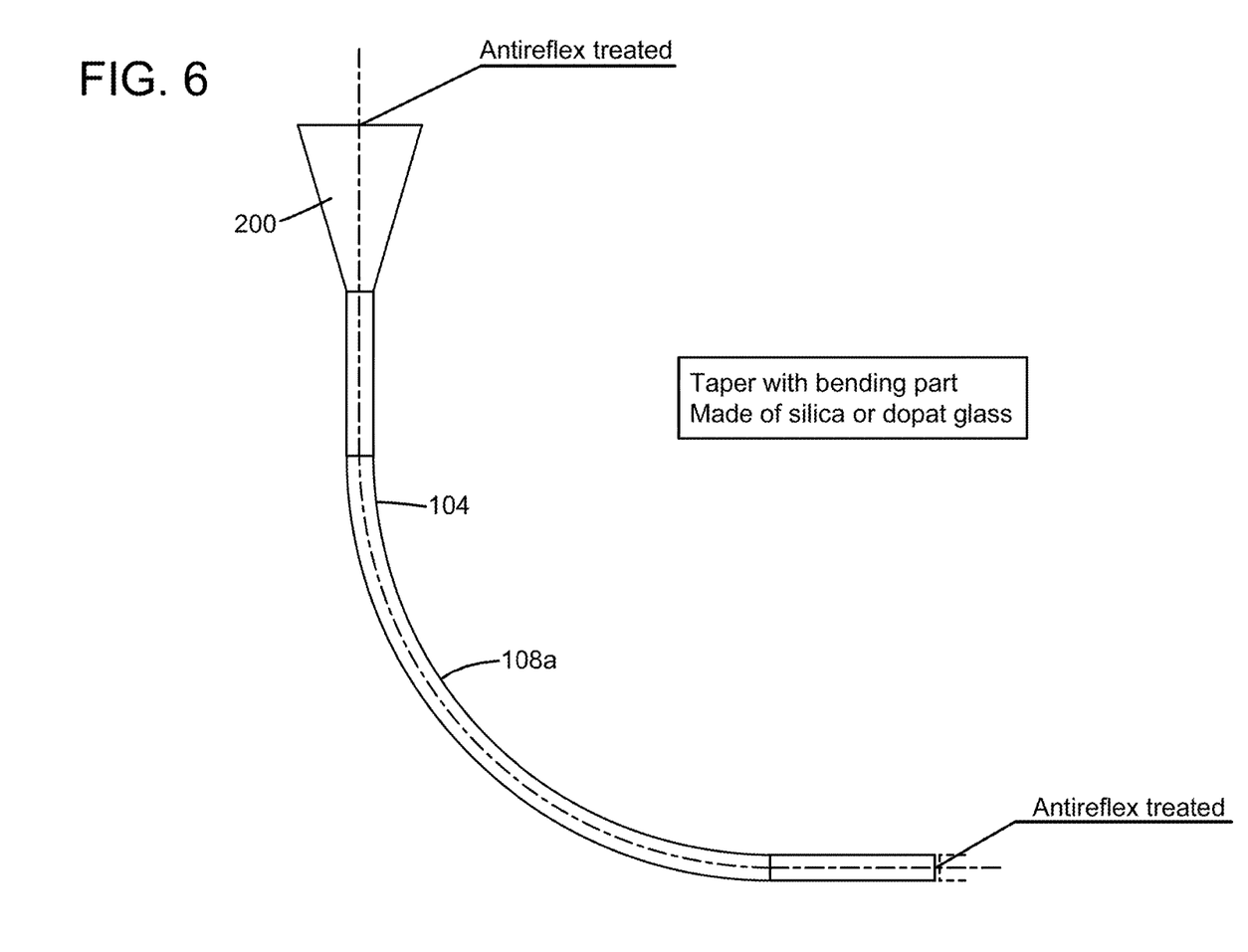
FIG. 6 is a front elevational view of the tapering unit connected to the curved fiber optic cable.

As best shown in FIG. 6, because the angle $\beta$ is relatively large, or slightly above 40°, the radius of segment 108a must have a larger bending radius, compared to using a thicker cable 104 with a greater diameter, in order to reduce losses and to prevent the reflection angle from exceeding the total internal reflection angle in the cable 104. The bending radius of section 108 could be about 100 mm.

Figure 7:
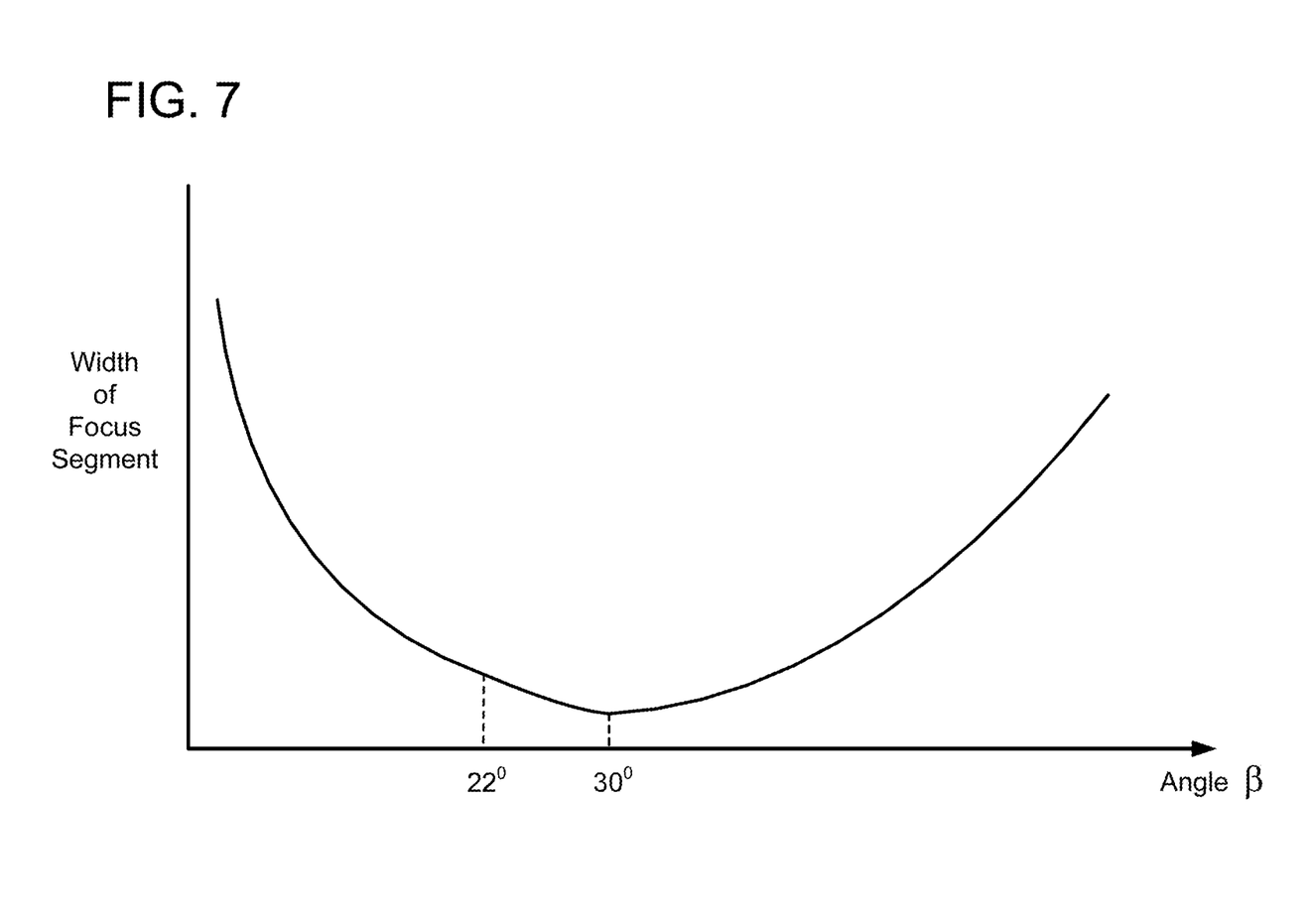
FIG. 7 is a graphic illustration of the correlation between reflection angle and size of focal segment.

FIG. 7 shows the relationship between the width or length of the focus segment 150 and the reflection angle $\beta$. The focus segment is the shortest when the reflection angle is 30° i.e. when the length (l) of the solar concentrator 102 is the same as the width (w). It was surprisingly discovered that by increasing the length (l) relative to the width (w) of the solar concentrator 102, the reflection angles inside the tapering device 200 where reduced to such an extent that that the reflection angles within the cable 104 also stayed within or below the total reflection angles of the cable 104. By using a length (l) of the solar concentrator 102 that is shorter than the width (w), the reflection angles increase to a value greater than 30° and the light passes through the walls of the tapering unit 200 and the cable 104 so that no or very little light can propagate therethrough.

While the present invention has been described in accordance with preferred compositions and embodiments, it is to be understood that certain substitutions and alterations may be made thereto without departing from the spirit and scope of the following claims.

We claim:
1. A solar power system, comprising,
a solar concentrator having a lens disposed therein, the solar concentrator having a first cone-shape and a bottom, the solar concentrator having a length (l) that is longer than a width (w) at the lens of the solar concentrator;
a solid tapering device disposed at the bottom, the tapering device having a second cone-shape;
the tapering device having a truncated bottom surface connected to a first curved glass loop section of a cable, the cable having a second curved glass loop section and a straight section, the first curved loop section having a first end surface, the second curved loop section having a second end surface, the straight section having a third end surface, the first end surface and the second end surface having a first gap defined therebetween, the second end surface and the third end surface having a second gap defined therebetween;
the solar concentrator being adapted to receive solar power as rays and conveying and concentrating rays as light towards a focus line or segment at the tapering device, the tapering device being in communication with an upper end of the first curved glass loop section, the first curved glass loop section conveying the light to the second curved glass loop section via and across the first gap, the second curved glass loop section conveying the light to the curved glass section via and across the second gap,
while transmitting light, rotating the first curved glass loop section relative to the second curved glass loop section at the first gap; and
rotating the second curved glass loop section relative to the curved glass section at the second gap so that the solar concentrator follows a path of a sun.

2. The solar power system according to claim 1 wherein the second cone-shape is substantially congruent with the first cone-shape.

3. The solar power system according to claim 1 wherein rays are conveyed and reflected inside the tapering device.

4. The solar power system according to claim 1 wherein the curved glass section conveys and emits the light into an inside of a storage unit wherein the light converts into heat upon impact with the storage unit to heat the storage unit.

\* \* \* \* \*